INVENTORS
Cornelius F. Dietrich
Harry J. Smith
By Watson, Cole, Grindle & Watson
ATTORNEYS

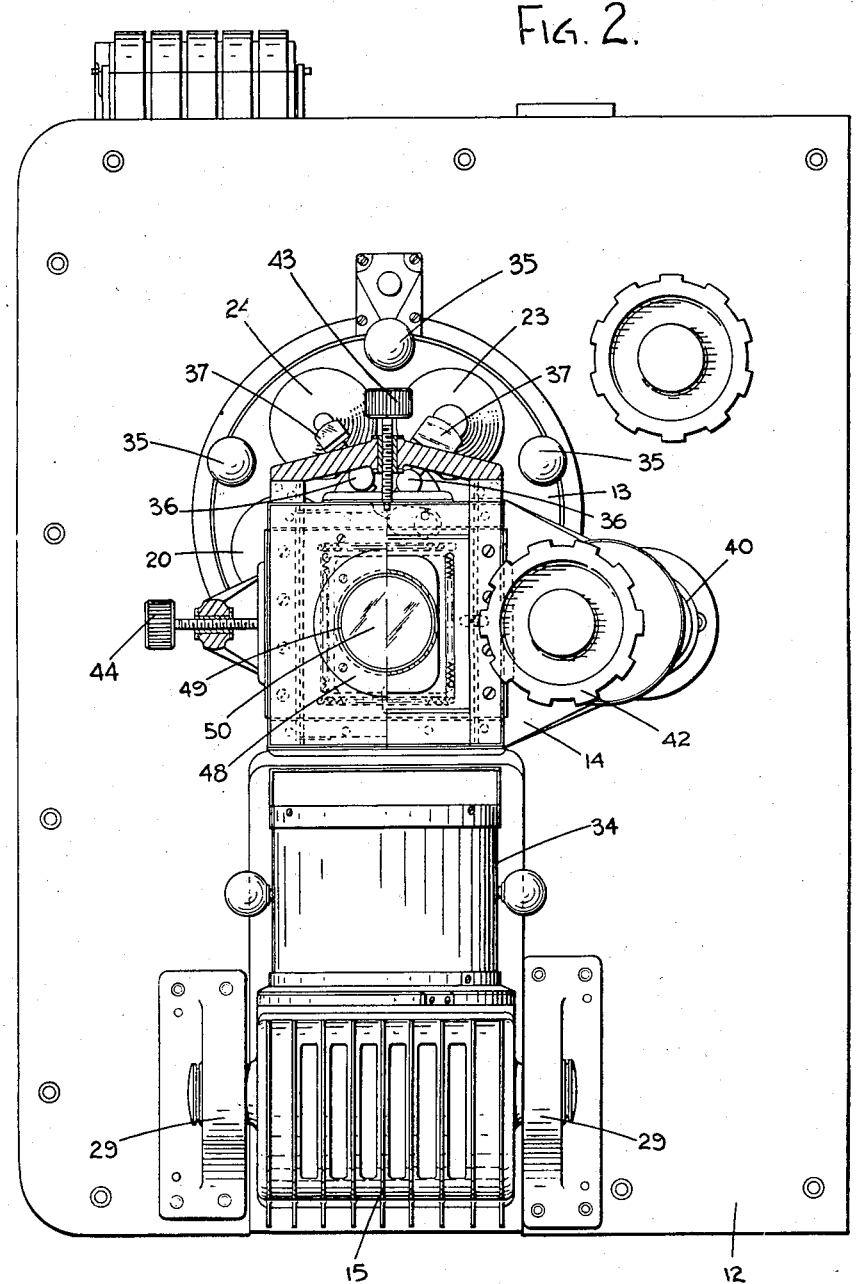

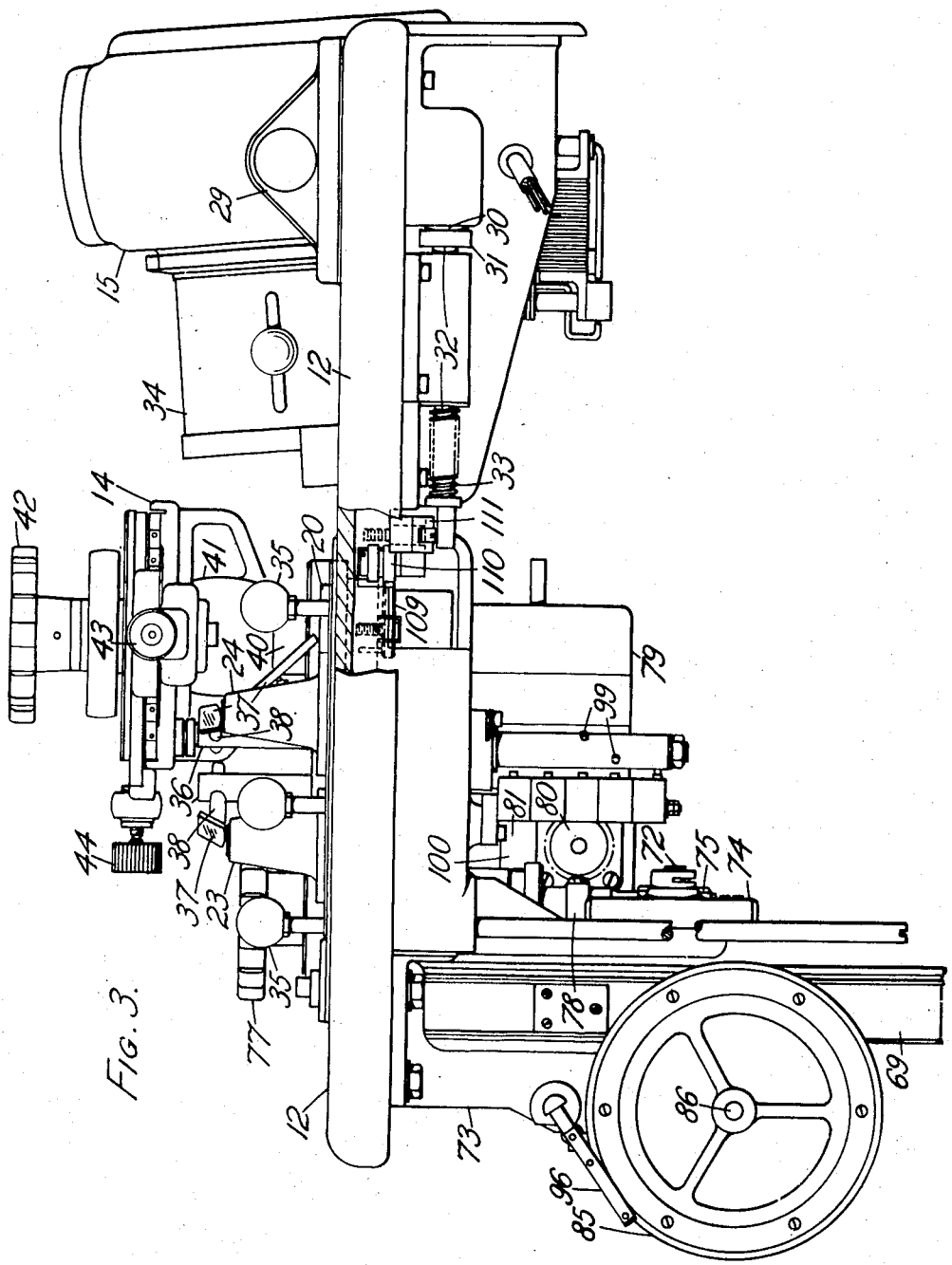

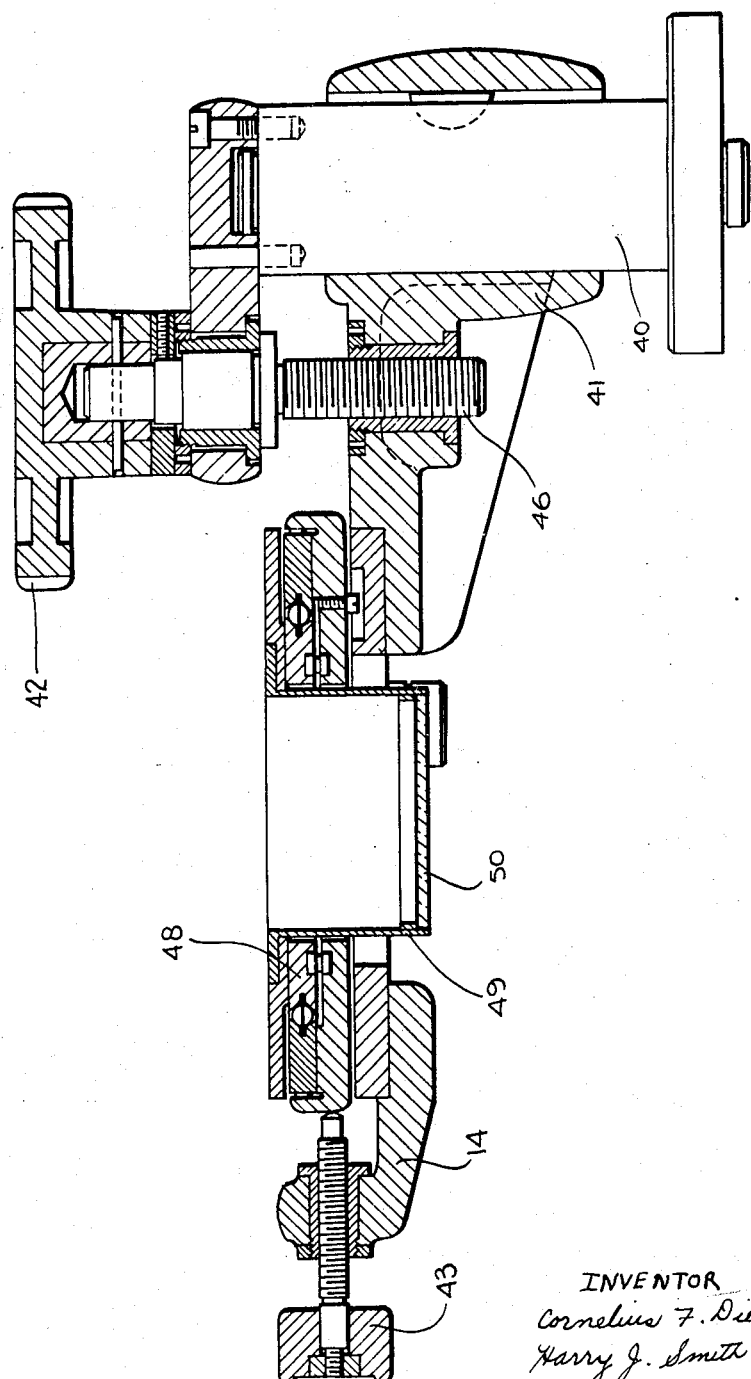

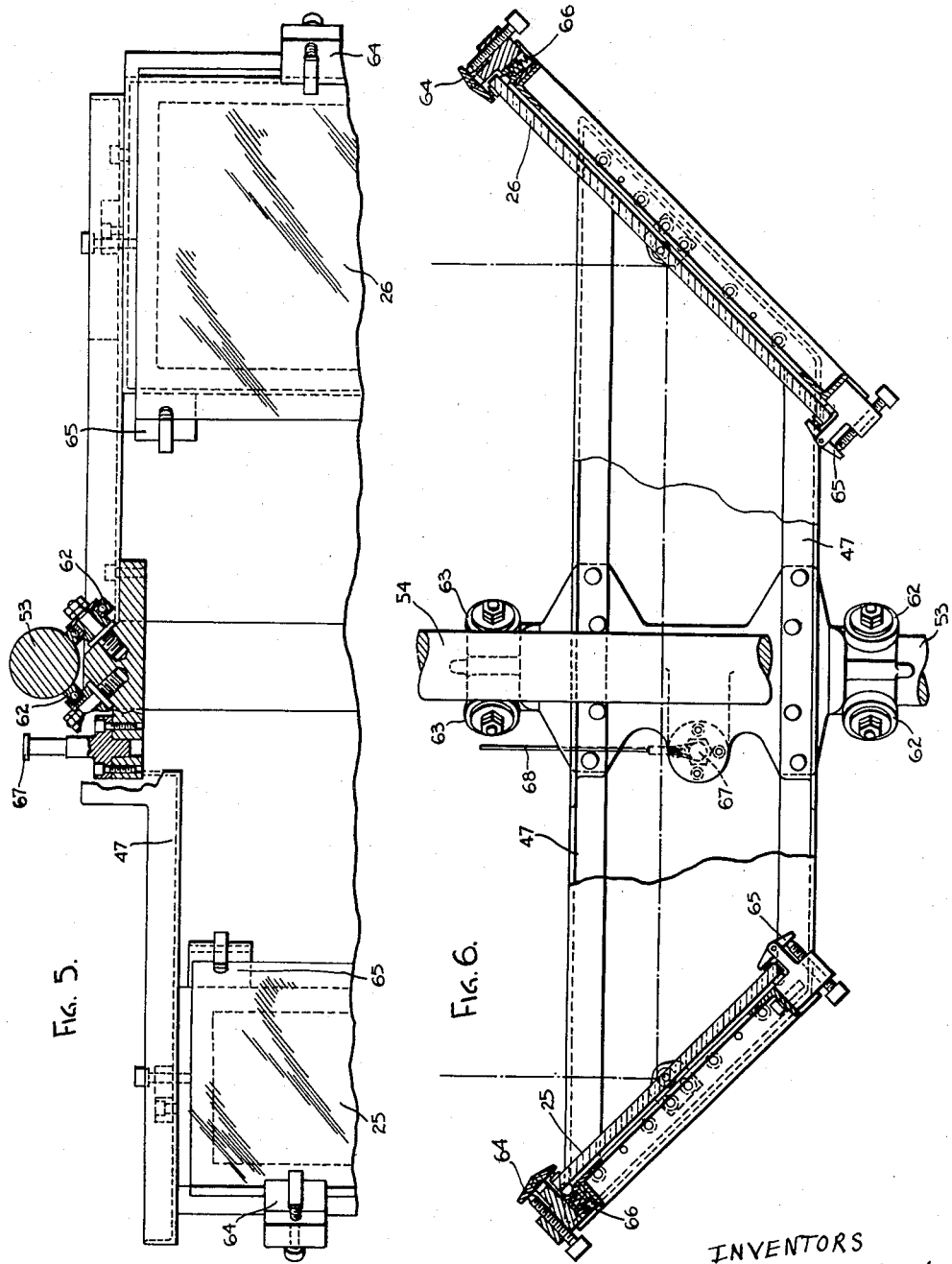

April 24, 1956  C. F. DIETRICH ET AL  2,742,815
OPTICAL PROJECTION APPARATUS
Filed March 25, 1952  8 Sheets-Sheet 6
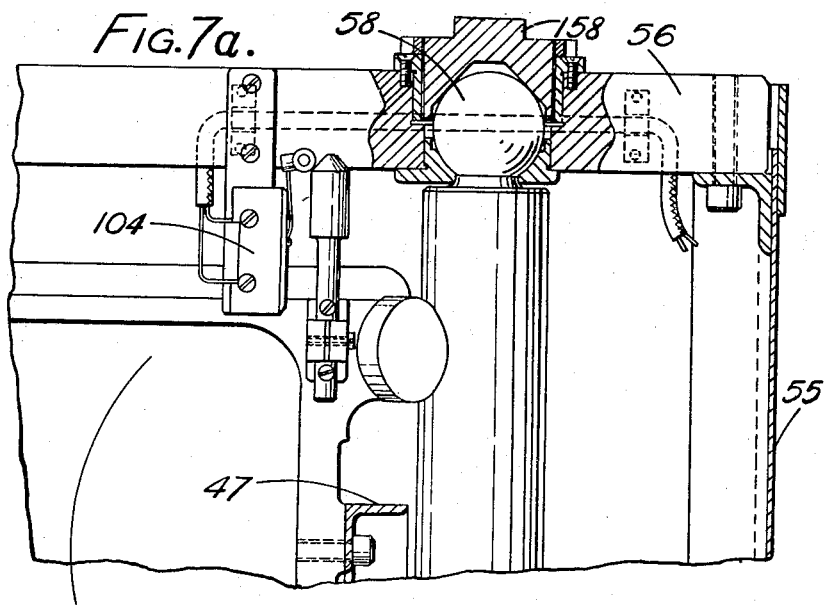
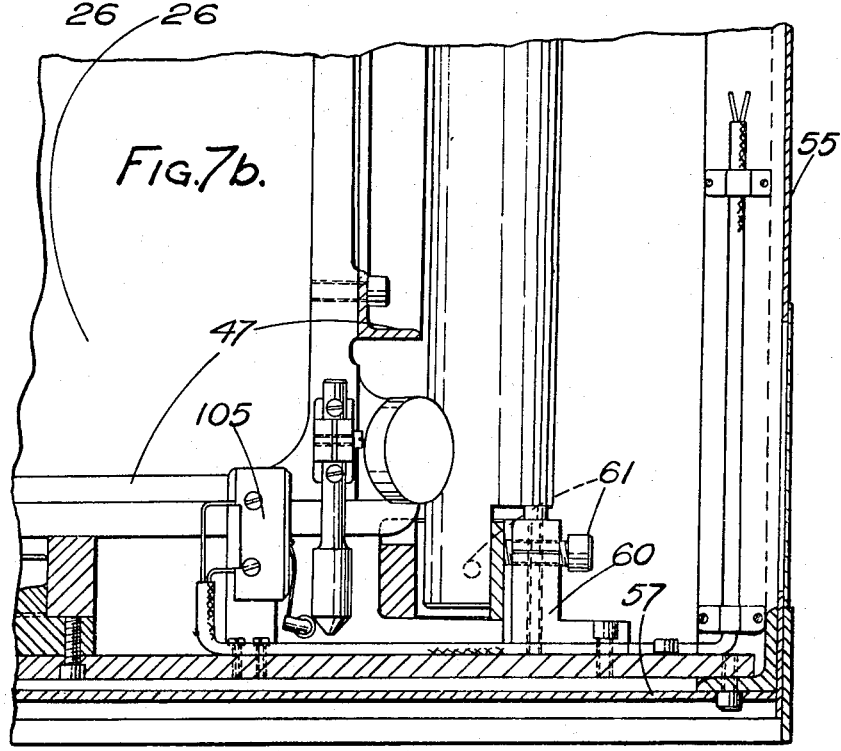
INVENTORS
Cornelius F. Dietrich
Harry J. Smith
By Watson, Cole, Grindle & Watson
ATTORNEYS

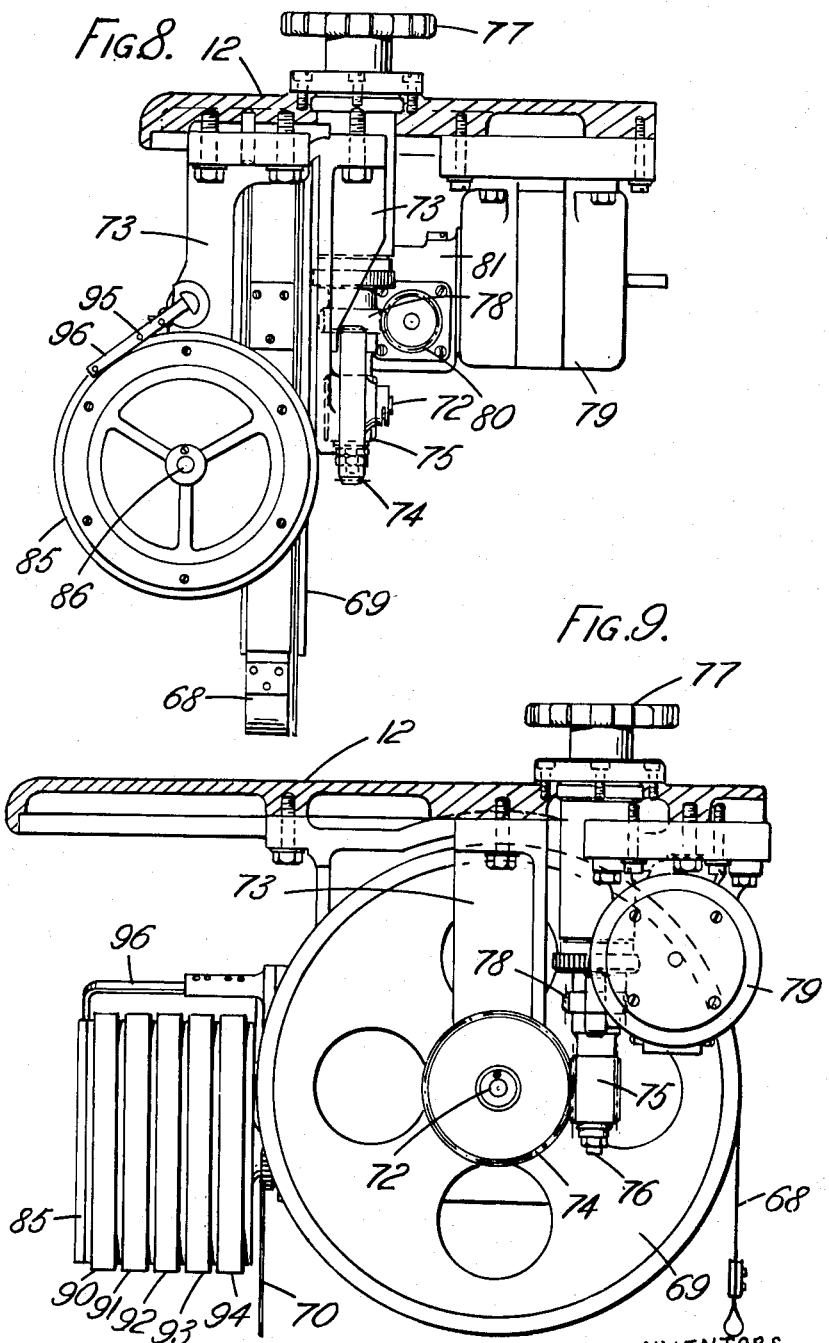

April 24, 1956 C. F. DIETRICH ET AL 2,742,815
OPTICAL PROJECTION APPARATUS

Filed March 25, 1952 8 Sheets-Sheet 8

INVENTORS
Cornelius F. Dietrich
Harry J. Smith
By Watson, Cole, Grindle & Watson
ATTORNEYS

United States Patent Office 2,742,815
Patented Apr. 24, 1956

2,742,815

OPTICAL PROJECTION APPARATUS

Cornelius Frank Dietrich and Harry John Smith, Slough, England, assignors to Optical Measuring Tools Limited, Slough, England, a British company Application March 25, 1952, Serial No. 278,404

Claims priority, application Great Britain March 27, 1951

9 Claims. (Cl. 88—24)

This invention comprises improvements in or relating to optical projection apparatus. By "optical projection apparatus" is meant apparatus in which a magnified image of an object to be examined is cast on to a projection screen by optical means. For example, it may be desired to cast upon the screen a magnified image of a screw thread, the shape of which is to be compared with a standard, or in the manufacture of type-stamps it may be desired to cast upon a screen a magnified image of the operative portion of the stamp in order to compare its outline with a standard. In such apparatus it is frequently desirable to be able to vary the degree of magnification over a range, and where a wide range of varying magnification is called for, it may be desirable to use a series of objectives of different focal lengths. It is an object of the present invention to provide optical projection apparatus in which the amount of magnification can be readily varied over a wide range with convenience to the operator.

The invention comprises in optical projection apparatus the combination of an objective mounting comprising a plurality of objectives, the mounting being movable to bring any one of the objectives desired into an operative position, a projection screen, an object-holder adapted to move an object held therein to or from the operative objective to focus an image on the screen, an illuminant for the object, and mirror means in the light path from objective to screen, movable to vary the light path to afford a range of magnifications for each objective.

By the use of an object-holder which can be moved to focus the work, it becomes possible to effect focussing without moving the objective or the screen, and by the use of a movable mirror in the light-path from objective to screen it becomes possible to vary the degree of magnification, also without moving the objective or the screen, and as the objective and the screen do not need to be moved, either for focussing or for varying the magnification (except to change from one objective to the other when the degree of magnification desired passes out of the range obtainable by movement of the mirror) the degree of magnification for any particular objective is solely dependent upon the position of the mirror. This makes it possible to connect the mirror to indicating means which show conveniently the degree of magnification to the observer.

One convenient form of such indicating means consists of a drum which is mechanically connected to a cradle which carries the mirror-means, and which bears indications on its periphery of the degree of magnification, to be read against an index. In a preferred form the drum has a separate section for each objective provided so as to show separately the range of magnification obtainable with each objective.

Power-driven means for controlling the position of the mirror may be provided if desired. Preferably such means are associated with a hand-controlled fine movement for exact adjustment.

Conveniently a series of objectives are mounted on a turret which is rotatable to bring any objective desired into line with the optical axis of the instrument. For viewing solid objects the turret may carry mirrors which, upon rotation of the turret, automatically come into line with a light beam which they direct upon any object located in the object-holder in the optical axis of the instrument. The turret may be interlocked with illuminating means for the drum which carries indications of the magnification, and by this means only that section of the drum which relates to the objective in use will be illuminated, and the operator is thereby saved from the risk of making mistakes in reading the drum.

The following is a description by way of example of one specific construction of optical projection apparatus in connection with the invention:

Figure 2 is a plan of the lamp house, stage and lens-turret;

Figure 3 is a side elevation of the parts shown in Figure 2 and of the parts within the casing immediately below them, the sides of the casing being removed to afford the view;

Figure 4 is a vertical section through the stage;

Figure 5 is a half-plan of a mounting for the movable mirrors;

Figure 6 is a side elevation of the same;

Figure 7a is a view of the same in its uppermost position in a vertical plane at right angles to the plane of Figure 6;

Figure 7b is similar to Figure 7a, but the mirrors in their lowest position;

Figure 8 is a side elevation of the focussing drive and indicator;

Figure 9 is a front elevation of the same, and,

Figure 1:
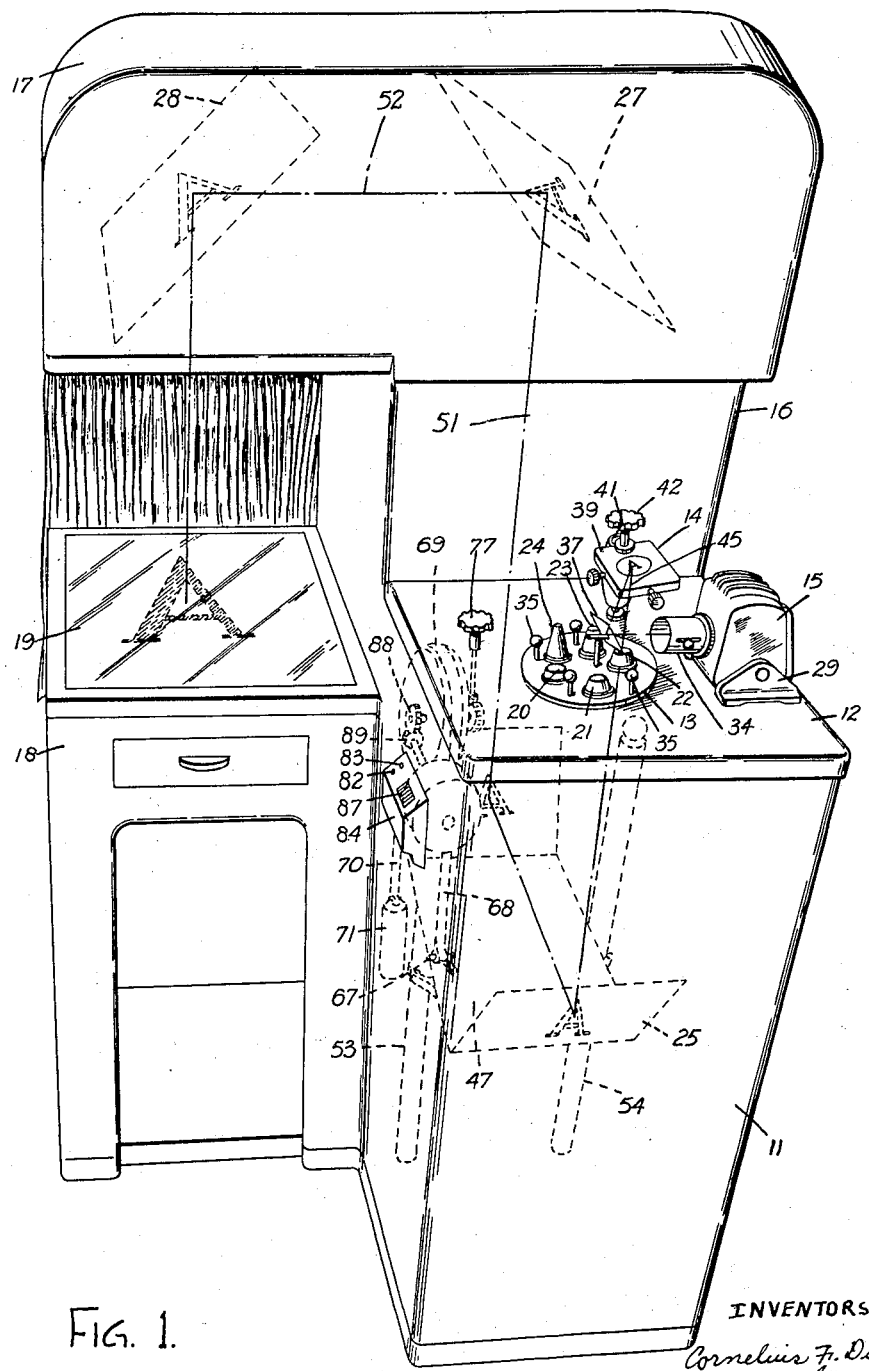
Figure 1 is a general perspective view of the apparatus showing the external shape and the general arrangement of the principal internal parts.

The apparatus comprises a sheet metal pedestal 11, the top of which is covered by a turret platform 12 supporting a lens-turret 13 and also an adjustable work-stage 14 and a lamp house 15. At one side of the pedestal 11 and turret platform is a mirror chamber 16 and the top of the mirror chamber projects forwardly at 17 over another pedestal 18, the top of which supports a horizontal projection screen 19. Objects placed upon the work-stage 14 (also herein referred to as the object-holder) are illuminated by the lantern 15 and the turret 13 carries a series of objectives 20, 21, 22, 23, 24, any one of which can be brought into place beneath the work-stage 14 and will serve to project an image of the work piece or other object on to the projection screen 19, the beam between the objective and of a projection screen passing through the mirror chamber 16 and being successively reflected by mirrors 25, 26, 27 28 therein, so that it is presented to the operator on the projection screen 19 correctly. The controls are all mounted on the pedestal 11 so as to be easily accessible to the operator, who stands in the angle between the platform 12 and the projection screen 19.

The turret platform 12 is a flat, rectangular casting with downturned edges, and it carries, at the back, trunnions 29 in which is pivoted the housing of the projection lamp 15. The housing of the projection lamp 15 extends below the trunnions and somewhat below the level of the platform 12, but the lamp itself, that is to say the light-source or bulb, is a few inches above the level of the platform. Below the platform the lamp house carries a lateral projection 30 which is engaged by a dog 31 on a horizontal push-rod 32. The push-rod 32 extends forwardly from the lamp house below the platform and is urged in a forward direction by a spring 33. Rearward pressure on the push-rod 32 will therefore tilt the lamp house 15 downwardly. The object of this tilting arrangement will be hereinafter described. The lamp house carries a condenser lens 34 and directs a beam of light forwardly above the surface of the platform towards the turret 13.

The turret 13 is a circular table let into the upper surface of the platform and rotatably mounted. It carries a series of five objectives (20 to 24) of varying focal length arranged symmetrically around its axis and between the objectives it has five upstanding knobs 35 by any one of which the operator can rotate it. In the centre of the circle formed by the five objectives are five posts 36 for supporting mirrors 37 (only one of the mirrors is shown in Figure 1). Each post 36 carries a mirror 37 which is universally pivoted on a lateral arm 13 projecting from the post. The arm 38 can slide through the post 36, and can be secured in any desired position by friction or by a clamping screw. The mirrors are adjusted so that when any particular objective is brought into line with the lamp house, the corresponding mirror will be above the objective and a little to the rear of it as viewed from the lamp house, and will catch the light from the lamp house and reflect it upwardly as indicated by chain line 39, Figure 1.

To the left of the turret 13 as viewed by the operator, who stands on the side of the platform towards which the illuminating beam is directed, and slightly behind the turret, there is an upstanding column 40 (Figure 4) to carry the work-stage or holder 14. A stage-carrying bracket 41 is slidably mounted on the column, and a handwheel 42 and focussing screw 46 serve to move the bracket up or down the column as desired. The bracket 41 carries a rectangular mechanical stage provided with adjusting screws 43, 44, which overlies whatever objective on the turret 13 may have ben brought into line with the beam from the lamp house 15. The stage is open and any desired work-holding device may be secured in the stage. For instance, the work-holding device may consist of a rectangular plate 48 formed with a central wall 49 at the bottom of which is a glass plate 50. Any object placed on the glass plate can be microscopically examined by this apparatus. For example, a stamp for type of a fount of printer's type, or for a like purpose, can be placed so that its operative portion, that is to say, the end of the stamp which bears a character, can be laid on the glass with the character in contact with the glass. The objective beneath the stage is fixed, that is to say, it is not focussable, but remains at rest in the turret once the turret has been swung to bring it into position beneath the stage. Focussing is effected by lowering and raising the stage by the hand-wheel. The mirror which is appropriate to the particular objective which is in use receives light from the lamp house and directs it upwardly against the underside of the type-stamp or other workpiece located above the glass surface of the stage. Thence it is reflected downwardly from the underside of the workpiece into the objective along line 45.

Below the objective in the pedestal which supports the turret platform is the mirror 25, set at an angle of 45 degrees to the light beam. This mirror is carried in a cradle 47 which extends into the mirror chamber 16 and carries the second mirror 26, again at 45 degrees to the horizontal, but at 90 degrees to the first mirror. Therefore the second mirror will reflect the light beam upwardly as indicated by chain line 51. Above the second mirror 26 is a third mirror 27 set at 45 degrees to catch the beam 51 which has been reflected upwardly, and to direct it horizontally forward as indicated by line 52, that is, in a direction parallel to that of the original beam for the lamp house 15, to a fourth mirror 28 which reflects it down on to the projection screen 19.

The first mirror 25, and the second mirror 26 which is in the mirror chamber, are both mounted on the same cradle 47. The cradle is an angle-iron structure which is capable of being raised and lowered upon two vertical circular guide bars 53, 54, the general disposition of these parts being seen in dotted lines in Figure 1 and the details in Figures 5, 6, 7a and 7b. The guide bars 53, 54 are mounted in a rigid triangulated framework which is not fully shown in the drawings but part of which is seen at 55, 56, 57 in Figures 7a and 7b. It is connected on one side of the turret platform 12, and extends upwardly within the mirror chamber 16 to the top thereof, and forwardly above the projection screen 19 and supports the third and fourth mirrors in their correct angular position. This frame carries just below the level of the turret platform 12 socket members 58, and in the socket members there fit round heads 59 which are turned on the upper ends of the guide rods 53, 54. The lower ends of the guide rods enter pedestals 60 in the bottom 57 of the frame 55, in which pedestals they are centered by centering screws 61 radially to their axes. By appropriate adjustment of the centering screws (of which only one appears in Figure 7b, but there is another at right angles to it, for each bar) the two guide rods can be made exactly parallel to each other. The cradle 47 runs on the guide rods 53, 54 by means of rollers 62, 63 mounted to project from the sides of the cradle at about the centre of its length, that is, half-way between the two mirrors mounted on the cradle. The mirrors 25, 26 mounted on this cradle are optically ground, and the cradles carry suitable clamping devices 64, 65 with spring supports 66 so that the mirrors can be held and set at an exact angle relative to each other without in any way straining the surfaces out of true. As will be obvious, if the cradle 47 is lowered to the bottom of the guide rods, the length of the optical path 45, 51 of the beam between the objective and the projection screen 19 will be at a maximum, while if it is raised so that the first mirror 25 gets as close as possible to the underside of the objective, the light path will be reduced to a minimum for the apparatus. Between these two extremes any light path desired can be given without moving either the objective or the projection screen, and therefore the apparatus provides a range of magnification for the objective which is in use. If the five objectives on the turret are given focal lengths such that the maximum magnification obtainable with one objective is equal to, or a little more than, the minimum magnification obtainable with the next objective, it will be seen that by choice of objective and adjustment of the cradle, any magnification desired within a wide range can be secured. In an actual machine, the maximum path of the light beam was 206", the minimum path, about 140", and the total range of magnifications varied from $30 \times$ to $175 \times$.

In order to move the cradle 47 up and down, on the side of the cradle which is nearest the front, that is to say, the operator's side of the pedestal which supports the turret platform 12, there is a forwardly-projecting peg 67 (Figure 1 and Figures 5 and 6) to which a steel tape 68 may be attached. This tape is for lifting the cradle, and it passes upwardly from the peg around a steel drum 69 (Figures 1, 8 and 9). The drum also carries a second tape 70 which depends from it on the opposite side to that to which the cradle tape 68 is attached, and carries a counterweight 71, whereby the weight of the cradle is nearly balanced. The drum 69 also appears in Figure 3. It is mounted on a drum spindle 72 which is supported by bearings carried on brackets 73 (best seen in Figures 8 and 9) secured to the underside of the turret platform 12. The spindle 72 carries a worm-wheel 74 which is engaged by a worm 75 on a vertical spindle 76 which passes upwardly through the turret platform 12 and carries a hand-wheel 77 above the platform. Therefore by rotating the hand-wheel 77, the drum can be driven by the worm and the cradle 47 moved up or down. This adjustment is, however, very slow, although desirable on account of the fine setting which can be given to the cradle by the hand-wheel. In order to accelerate the movement of the cradle 47 when large adjustments are required, the handwheel spindle carries below the platform a skew gear 78, and the gear is capable of being driven by an electric motor 79 which carries a corresponding skew gear 80 and a reduction gear box 81 to drive the same, and which is itself bolted to the underside of the platform 12. The motor is a reversible motor, and is capable of being operated in either direction on pushing one or other of two push-buttons 82, 83 on a control panel 84 mounted on the front of the pedestal 11. Pushing one button rotates the motor in a direction to drive the cradle down, and pushing the other button rotates it to drive the cradle up. As soon as the push-button is released the motor stops, and any small final adjustment can be made by the operator with the aid of the hand-wheel 77. (See Figure 1.) In this manner any desired magnification setting of the parts can be rapidly effected, and also with great accuracy, but it is a matter of importance not only to be able to effect the adjustment, but also to know quantitatively exactly what the adjustment is.

Figure 10:
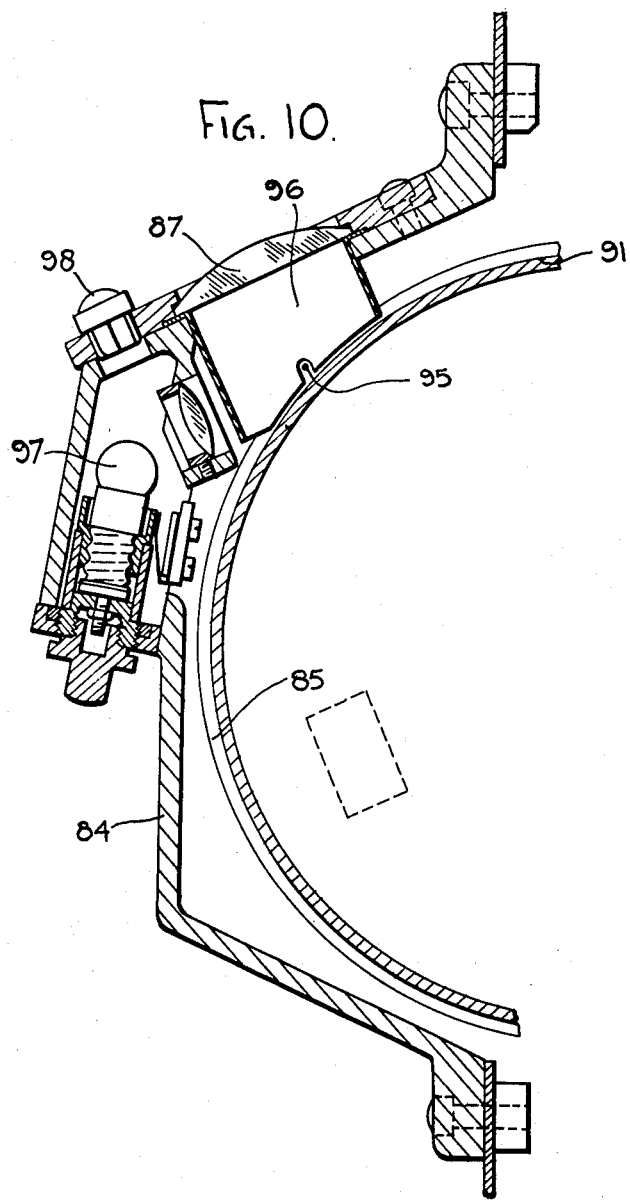
Figure 10 is a detail of the indicator.

To this end the drum spindle 72, which it will be remembered is connected by a worm-gear 74, 75 to the hand-wheel spindle 76, carries also a skew gear 88, which is connected by another skew gear 89 to an indicating drum 85 (Figures 3, 8 and 9) known as the magnification drum. The drum spindle 72 extends in a direction at right-angles to the front surface of the pedestal 11 which supports the turret-platform 12 and it projects slightly to the front of the pedestal through a suitable aperture therein, and it is at this point, behind control panel 84, that it carries the skew gear. Consequently the drum shaft 86 which is driven by the skew gear extends along the front of the pedestal 11, parallel thereto, and a little below the level of the platform 12. The control panel 84 has an observation window 87 in its upper side, through which the surface of the drum 85 can be inspected. The observation window 87 may be made of a magnifying material if desired. The surface of the drum is divided by grooves into five scale-strips 90, 91, 92, 93, 94 and each scale-strip is marked out with a scale which corresponds to the magnification given by one of the objectives 20, 21, 22, 23, 24, so that the five strips give five scales, one for each objective. In front of the drum 85, and beneath the observation window 87, there is stretched on a frame 96, a wire 95 to act as an index. It will be appreciated that in Figures 3, 8 and 9, the box of the control panel 84 is removed to show the inner parts; it is seen in section in Figure 10.

The space beneath the observation window 87 and above the scale-strips 90—94 is sub-divided by vertical partitions 96 fixed in the control panel 84 which houses the drum 85, so that each scale-strip is sub-divided from its neighbors. These partitions, and the scales 90—94 themselves, are black, and the markings on the scales are white. A minute electric lamp bulb 97 (Figure 10) is arranged close to each of the spaces between the partitions, with a corresponding coloured window 98 outside the panel 84 and opposite to the bulb 97 inside and beneath it. The rotating turret 13 which carries the objectives has a downwardly projecting spindle which carries cams 99 (Figure 3) and serves to operate a series of cam switches 100 connected up to the lamp bulbs 97. The switches 100 ensure that only lamp 97 is lighted up which corresponds to the scale-strip of the particular objective which is in use at a given time. Thus, the operator cannot make any mistake. He sets the turret to the magnification he requires, and then the scale-strip corresponding to the objective in use is automatically illuminated, and shows by its reading against the index the exact magnification to which the apparatus has been set.

It will be appreciated that as the objectives cover a wide range of focal lengths, it is desirable, with a view to minimising as much as possible the amount of adjustment of the work-stage which is required, to mount each objective in a mounting on the turret which stands up above the turret level by a distance bringing the objective approximately into focus. This distance will differ for each objective, and therefore the mirrors 37 on the turret 13 which are carried on universal joints by the posts 36 behind the objectives, one mirror for each objective, will be at a different height for one objective from the height of the corresponding mirror for another objective. Consequently, the light beam from the lamp house will need to be tilted up or down, and hence the lamp house 15 is mounted on trunnions 29, as already described. The edge of the turret 13 carries five cams 109, one for each objective, and these cams engage in turn a roller 110 on a lever 111 pivoted to the underside of the turret platform 12 and arranged to engage the aforesaid push-rod 32 which bears on the lug 31 on the lamp house 15. Therefore, when the turret 13 is rotated to bring a new objective into use, this automatically brings the appropriate cam into engagement with the lever 101, and therefore the push-rod 32 tilts the lamp house 15 automatically to the appropriate degree.

In order to centre the objective exactly in line with the optical axis of the apparatus there is a spring plunger (not shown) mounted on the underside of the turret 12 which is adapted to enter in one of a series of five notches, all on the edge of the turret 13. This ensures that when the turret is moved, it will be accurately directed to its new setting.

Referring again to Figures 7a and 7b, it will be seen that the cradle 47 carries two stop cams 102, 103 which, at the upper and lower limits of its movement, respectively, engage limit switches 104, 105 on the frame members 56, 57. These limit switches stop the motor 79 if the operator should keep either of the push buttons 82, 83 depressed too long.

By the apparatus of the present invention the examination and exact comparison of the outline of workpieces, such as stamps of the kind referred to, with a large-scale master-pattern, is readily effected, and the apparatus is capable of dealing, to take but one example, with all kinds of type, from that of a size of about one inch or seven-eights of an inch in depth, down to the smallest type in practical use.

We claim:

1. In optical projection apparatus the combination of an objective mounting comprising a plurality of objectives, the mounting being movable to bring any one of the objectives desired into an operative position, a projection screen, an object-holder adapted to move an object held therein to or from the operative objective to focus an image on the screen, an illuminant for the object, mirror means in the light path from objective to screen causing said light path to follow a devious course which mirror means comprises a mirror unit with at least two reflecting surfaces which combine to reflect the beam back along a path parallel to the incident beam, said mirror unit being movable in a direction parallel to said incident and reflected beams to vary the length of the light path and thereby afford a range of magnifications for each objective, a cradle carrying the mirror unit, a driving spindle operatively connected to move said cradle when revolved, with means to revolve the driving spindle at will whereby the position of the mirror unit may be varied as desired when the apparatus is in use, and a rotary drum also driven by the spindle which bears indications on its periphery of the degree of magnification to be read against an index.

2. Apparatus as claimed in claim 1 wherein the drum has a separate section for each objective provided so as to show separately the range of magnification obtainable with each objective.

3. Apparatus as claimed in claim 2 wherein the objectives are mounted upon a revolving turret capable of movement to bring any one objective into line between the object and the screen, and the turret is interlocked with illuminating means for the drum which carries the indications of magnification so that only that section of the drum which relates to the objective in use will be illuminated, and the operator is therefore saved from the risk of making mistakes in reading the drum.

4. In optical projection apparatus the combination of an objective mounting comprising a plurality of objectives, the mounting being movable to bring any one of the objectives desired into an operative position, a projection screen, an object-holder adapted to move an object held therein to or from the operative objective to focus an image on the screen, an illuminant for the object, mirror means in the light path from objective to screen movable to vary the light path to afford a range of magnifications for each objective, and indicating means connected to the movable mirror means to show the degree of magnification, said indicating means comprising a drum which is mechanically connected to a cradle which carries the mirror means said drum bearing indications on its periphery of the degree of magnification to be read against an index.

5. Apparatus as claimed in claim 4 wherein the drum has a separate section for each objective provided so as to show separately the range of magnification obtainable with each objective.

6. In optical projection apparatus the combination of an objective mounting comprising a plurality of objectives mounted upon a turret whereby any one of the objectives desired can be brought into an operative position by revolving the turret, a projection screen, an object-holder adapted to move an object held therein to or from the operative objective to focus an image on the screen, an illuminant for the object, mirror means in the light path from objective to screen movable to vary the light path to afford a range of magnification for each objective, and mirrors carried upon the turret which, upon rotation of the turret, automatically come into line with a light beam which they direct upon any object located in the object-holder in the optical axis of the instrument.

7. In optical projection apparatus the combination of an objective mounting comprising a plurality of objectives, the mounting being movable to bring any one of the objectives desired into an operative position, a projection screen, an object-holder adapted to move an object held therein to or from the operative objective to focus an image on the screen, an illuminant for the object, mirror means in the light path from objective to screen movable to vary the light path to afford a range of magnification for each objective, a cradle carrying the mirror means which cradle runs upon vertical guide-posts provided with locating screws which can be operated to render the posts exactly parallel, and a rotary drum which is mechanically connected to the cradle and bears on its periphery indications of magnification to be read against an index.

8. Apparatus as claimed in claim 7 wherein the guide-posts each have ball members at one end and locating screws at the other end.

9. In optical projection apparatus the combination of an objective mounting comprising a plurality of objectives, the mounting being movable to bring any one of the objectives desired into an operative position, a projection screen, an object-holder adapted to move an object held therein to or from the operative objective to focus an image on the screen, an illuminant for the object, mirror means in the light path from objective to screen causing said light path to follow a devious course which mirror means comprises a mirror unit with at least two reflecting surfaces which combine to reflect the beam back along a path parallel to the incident beam, said mirror unit being movable in a direction parallel to said incident and reflected beams to vary the length of the light path and thereby afford a range of magnifications for each objective, a driving spindle operatively connected to move said mirror unit when revolved, with power driven means for revolving the driving spindle at will whereby the position of the mirror unit may be varied as desired when the apparatus is in use, and a hand controlled fine movement for exact adjustment associated with the power driven means.

References Cited in the file of this patent

UNITED STATES PATENTS

| | | |
|---|---|---|
| 2,100,967 | Levy | Nov. 30, 1937 |
| 2,411,694 | Place | Nov. 26, 1946 |
| 2,472,907 | Kolesnikoff | June 14, 1949 |
| 2,488,146 | Steinhaus | Nov. 15, 1949 |
| 2,518,252 | Reardon | Aug. 8, 1950 |
| 2,552,238 | Turner | May 8, 1951 |
| 2,578,037 | Berlant | Dec. 11, 1951 |
| 2,629,282 | Legg | Feb. 24, 1953 |

FOREIGN PATENTS

| | | |
|---|---|---|
| 546,809 | Great Britain | July 30, 1942 |